US012649658B2

(12) United States Patent　　　　(10) Patent No.:　US 12,649,658 B2
Lan　　　　　　　　　　　　　　　　(45) Date of Patent:　　　Jun. 9, 2026

(54) METHOD OF MANUFACTURING SILICON NANO-POWDERS AND MANUFACTURING EQUIPMENT IMPLEMENTING SUCH METHOD

(71) Applicant: NATIONAL TAIWAN UNIVERSITY, Taipei (TW)

(72) Inventor: Chung-Wen Lan, Taipei City (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 560 days.

(21) Appl. No.: 18/181,997

(22) Filed: Mar. 10, 2023

(65) Prior Publication Data

US 2023/0303394 A1　　Sep. 28, 2023

(30) Foreign Application Priority Data

Mar. 14, 2022　(TW) .................................. 111109170

(51) Int. Cl.
C01B 21/068　　(2006.01)
B82Y 30/00　　(2011.01)
B82Y 40/00　　(2011.01)
C01B 21/072　　(2006.01)

(52) U.S. Cl.
CPC ............ C01B 21/068 (2013.01); B82Y 30/00 (2013.01); B82Y 40/00 (2013.01); C01B 21/072 (2013.01); C01P 2006/80 (2013.01)

(58) Field of Classification Search
CPC ..... C01B 21/068; C01B 21/072; B82Y 30/00; B82Y 40/00; C01P 2006/80
See application file for complete search history.

(56) References Cited

U.S. PATENT DOCUMENTS

2016/0228951 A1*　8/2016　Lekhtman ................. B22F 9/00

FOREIGN PATENT DOCUMENTS

EP　　　　0123100 A1 *　10/1984　.......... C01B 33/033
JP　　　2008069301　　　3/2008
WO　WO2007119605 A1 *　10/2007

OTHER PUBLICATIONS

Zakirov at el "Silicon Production via Reaction of Silicon Tetrachloride and Aluminum Subchloride", The Minerals, Metals & Materials Society and ASM International, vol. 50B, pp. 2197-2204 (Year: 2019).*
Machine Translation of WO 2007119605A1 (Year: 2007).*

* cited by examiner

*Primary Examiner* — Daniel C. McCracken
*Assistant Examiner* — Starfari Teshawn McClain
(74) *Attorney, Agent, or Firm* — MUNCY, GEISSLER, OLDS & LOWE, P.C.

(57)　　　　　ABSTRACT
A method of manufacturing silicon nano-powders and a manufacturing equipment implementing such method. The method according to the invention utilizes a plurality of aluminum powders to react with a silicon tetrahalide into a plurality of silicon nano-powders and an aluminum trihalide to obtain the silicon nano-powders.

5 Claims, 15 Drawing Sheets

1 preparing a plurality of aluminum powders and a silicon tetrahalide.　⟋—S10 heating the plurality of aluminum powders and the silicon tetrahalide to a reaction temperature such that the plurality of aluminum powders react with a reaction gas of the silicon tetrahalide into a plurality of silicon nano-powders and an aluminum trihalide, to obtain the plurality of silicon nano-powders.　⟋—S12

| | Weight% | Atomic% |
|---|---|---|
| C K | 14.73 | 27.16 |
| O K | 5.11 | 7.07 |
| Al K | 80.16 | 65.78 |
| Totals | 100.00 | |

| | Weight% | Atomic% |
|---|---|---|
| C K | 4.59 | 9.78 |
| O K | 5.25 | 8.40 |
| Al K | 0.94 | 0.89 |
| Si K | 86.93 | 79.27 |
| Cl K | 2.30 | 1.66 |
| | | |
| Totals | 100.00 | |

METHOD OF MANUFACTURING SILICON NANO-POWDERS AND MANUFACTURING EQUIPMENT IMPLEMENTING SUCH METHOD

CROSS-REFERENCE TO RELATED APPLICATION

This utility application claims priority to Taiwan Application Serial Number 111109170, filed Mar. 14, 2022, which is incorporated herein by reference.

BACKGROUND OF THE INVENTION

1. Field of the Invention

The invention relates to a method of manufacturing a plurality of silicon nano-powders and a manufacturing equipment implementing such method, and more in particular, to a method of manufacturing a plurality of silicon nano-powders, with easy shape control, high purity and mass production, and a manufacturing equipment implementing such method.

2. Description of the Prior Art

High-purity silicon nano-powders have been used to manufacture many products with high commercial value, for example, for the production of hydrogen, for the manufacture of anodes of lithium-ion batteries, for the manufacture of silicon oxide and silicon carbide and so on.

Taking lithium-ion batteries as an example, lithium-ion batteries have been widely commercial energy storage devices. Lithium-ion batteries have the advantages of high energy density, high discharge voltage, small internal resistance, small self-discharge, no memory effect, and no pollution for environmental protection. Lithium-ion batteries have been widely used in various products in life, such as mobile phones, notebook computers, hearing aids, video cameras, electric vehicles, etc. In addition, lithium-ion batteries are also widely used in modern high-tech fields such as torpedoes, aircraft, and micro-electromechanical systems. Therefore, lithium-ion batteries are ideal new energy sources for human beings. However, there are still many deficiencies in currently commercial lithium-ion batteries, which make it impossible to meet the demand in the application of high specific energy power sources. As far as the anode is concerned, most of the currently commercial lithium-ion batteries use carbonaceous materials such as graphite as the anode. Because the anode made of graphite has the advantages of good conductivity and long cycle life. However, since the theoretical specific capacity of graphite is only 372 mAh/g, the specific capacity of the negative electrode made of graphite is low, which is far from meeting the capacity requirements of high specific energy power supply systems. Therefore, the development of anode materials with high capacity and excellent performance has become a current research hotspot.

Silicon has high theoretical lithium storage capacity, low lithium extraction potential (0.2-0.3V vs. Li/Li+), and silicon is an element with abundant reserves on the earth. Therefore, silicon is considered to be the most likely anode material to replace graphite. However, the large volume expansion (~400%) of silicon anode in the process of lithiation/delithiation leads to the degradation of silicon particles and the destruction of the solid electrolyte interface. These problems can cause severe degradation of capacitance or even overall damage, which hinders the commercial application of silicon anodes in lithium-ion batteries.

But, a two-dimensional silicon nano-sheet material has the ability to resist expansion and fracture, and because it has a faster diffusion rate and a lower diffusion barrier of lithium ions, it has gradually been widely studied and applied to lithium ion battery anode materials.

Regarding the prior art of manufacturing silicon nano-sheets, please refer to Japanese Laid-Open Patent Publication No. 2008-069301. The prior art teaches first to produce layered polysilane powders represented by the compositional formula Si6H6 by reacting calcium disilicide with dense hydrogen chloride cooled below −30° C. The prior art then prepares silicon nano-sheets are prepared by reacting an organic compound having a carbon-carbon unsaturated bond with an organic group using a hydrosilylation reaction catalyst, and replacing the hydrogen atoms of the layered polysilane with an organic group. However, in layered polysilane powders, hydrogen atoms bonded to silicon atoms are easily replaced by hydroxyl groups. Therefore, the prior art does not benefit in purification and mass production of silicon nano-sheets.

In addition, most of the prior arts of manufacturing silicon nano-powders only manufacture silicon nano-powders with single shape, and cannot manufacture silicon nano-powders with different shapes for different product fields, such as a sphere, a wire, a flake etc.

In addition to the technology that benefits in the mass production of silicon nano-powders that still needs to be studied, the equipment that benefits in the mass production of silicon nano-powders also needs to be researched and developed, especially the manufacturing equipment that can manufactures silicon nano-powders with different shapes.

SUMMARY OF THE INVENTION

Accordingly, one scope of the invention is to provide a method of manufacturing a plurality of silicon nano-powders with easy shape control, high purity and mass production, and a manufacturing equipment implementing such method. The method according to the invention can manufacture a plurality of silicon nano-powders with high purity. The manufacturing equipment according to the invention is beneficial to the mass production of a plurality of silicon nano-powders with high purity.

A method of manufacturing a plurality of silicon nano-powders, according to a preferred embodiment of the invention, is, firstly, to prepare a plurality of aluminum powders and a silicon tetrahalide. Finally, the method according to the preferred embodiment of the invention is to heat the plurality of aluminum powders and the silicon tetrahalide to a reaction temperature such that the plurality of aluminum powders react with a reaction gas of the silicon tetrahalide into a plurality of silicon nano-powders and an aluminum trihalide, to obtain the plurality of silicon nano-powders.

In one embodiment, the reaction temperature ranges from 100° C. to 660° C.

In one embodiment, the silicon tetrahalide can be $SiF_4$, $SiCl_4$, $SiBr_4$, $SiI_4$ or a mixture therebetween.

In one embodiment, an appearance of one of the plurality of silicon nano-powders exhibits a flake, a sphere, a wire, a tube and so on.

Further, the method according to the preferred embodiment of the invention is also to perform an acid washing treatment on the plurality of silicon nano-powders to purify the plurality of silicon nano-powders.

Further, the method according to the preferred embodiment of the invention is also to heat the plurality of silicon nano-powders and the aluminum trihalide to sublimate the aluminum trihalide, and further to purify the plurality of silicon nano-powders.

A manufacturing equipment for manufacturing a plurality of silicon nano-powders, according to a preferred embodiment of the invention, includes a furnace, a reactant supply source and a recovering apparatus. A plurality of aluminum powders are placed in the furnace. The reactant supply source communicates with the furnace, and is for supplying a silicon tetrahalide into the furnace. The recovering apparatus communicates with a top of the furnace. The furnace heats the plurality of aluminum powders and the silicon tetrahalide to a reaction temperature such that the plurality of aluminum powders react with a reaction gas of the silicon tetrahalide into a plurality of silicon nano-powders and an aluminum trihalide. The reaction temperature ranges from 100° C. to 660° C. The aluminum trihalide is sublimated and recovered by the recovering apparatus to obtain the plurality of silicon nano-powders.

Further, the manufacturing equipment according to a preferred embodiment of the invention also includes a stirring apparatus. The stirring apparatus is configured to operate within the furnace. The stirring apparatus stirs the plurality of aluminum powders during the reaction between the plurality of aluminum powders and the reaction gas.

Compared to the prior art, the method according to the invention can manufacture a plurality of silicon nano-powders with easy shape control, high purity and mass production. The manufacturing equipment according to the invention is beneficial to the mass production of a plurality of silicon nano-powders with high purity.

The advantage and spirit of the invention may be understood by the following recitations together with the appended drawings.

BRIEF DESCRIPTION OF THE APPENDED DRAWINGS

DETAILED DESCRIPTION OF THE INVENTION

Some preferred embodiments and practical applications of this present invention would be explained in the following paragraph, describing the characteristics, spirit, and advantages of the invention.

Figure 1:
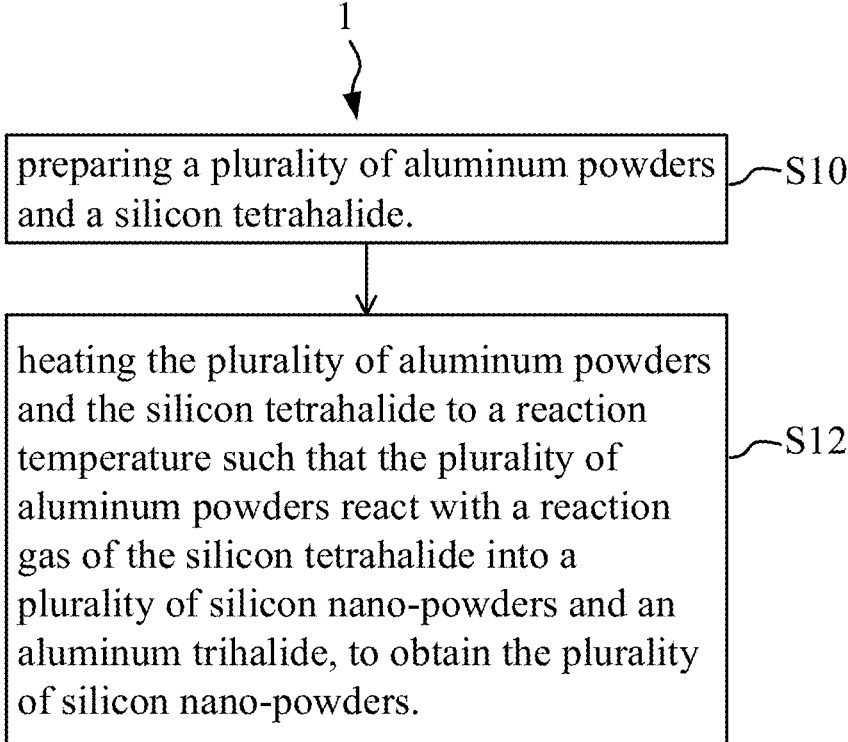
FIG. 1 is a flowchart illustrating a method of manufacturing a plurality of silicon nano-powders according to the preferred embodiment of the invention.

Referring to FIG. 1, FIG. 1 illustratively shows a method 1, according to the preferred embodiment of the invention, of manufacturing a plurality of silicon nano-powders.

As shown in FIG. 1, the method 1 according to the preferred embodiment of the invention, firstly, performs step S10 to prepare a plurality of aluminum powders and a silicon tetrahalide.

In one embodiment, the silicon tetrahalide can be $SiF_4$, $SiCl_4$, $SiBr_4$, $SiI_4$ or a mixture therebetween.

Finally, the method 1 according to the preferred embodiment of the invention performs step S12 to heat the plurality of aluminum powders and the silicon tetrahalide to a reaction temperature such that the plurality of aluminum powders react with a reaction gas of the silicon tetrahalide into a plurality of silicon nano-powders and an aluminum trihalide, to obtain the plurality of silicon nano-powders.

In one embodiment, the reaction temperature ranges from 100° C. to 660° C., which is lower than the melting point of aluminum.

Taking $SiCl_4$ as an example of silicon tetrahalide, the reaction between the plurality of aluminum powders and the reaction gas of silicon tetrahalide is represented by the following reaction formula:

$$4Al(s)+3SiCl_4(g) \rightarrow 3Si(s)+4AlCl_3(s/g), \Delta G=-218.6 \text{ KJ/mole (298 K)}$$

It should be emphasized that the boiling point of $SiF_4$ is −90.3° C., the boiling point of $SiCl_4$ is 56.8° C., the boiling point of $SiBr_4$ is 155.0° C., and the boiling point of $SiI_4$ is 290.0° C. The boiling point of $AlCl_3$ is 183° C. Silicon tetrahalide is easy to supply in the form of gas, and aluminum trihalide is also easy to sublimate into gas to facilitate separation from silicon nano-powders.

In one embodiment, an appearance of one of the plurality of silicon nano-powders exhibits a flake, a sphere, a wire, a tube and so on. The shape of the plurality of silicon nano-powders depends on the shape of the plurality of aluminum powders used. To manufacture silicon nano-sheets, the aluminum powders used must be close to the shape and size of the silicon nano-sheets to be manufactured.

The plurality of aluminum nano-sheets can be formed by rolling aluminum particles with appropriate particle size.

Further, the method 1 according to the preferred embodiment of the invention is also to perform an acid washing treatment on the plurality of silicon nano-powders to purify the plurality of silicon nano-powders.

Further, the method 1 according to the preferred embodiment of the invention is also to heat the plurality of silicon nano-powders and the aluminum trihalide to sublimate the aluminum trihalide, and further to purify the plurality of silicon nano-powders.

Regarding the implement of the method according to the invention, a plurality of aluminum powders and a silicon tetrahalide can be placed in a closed single autoclave reactor, and an inert atmosphere is introduced into the autoclave reactor or the interior of the autoclave reactor is evacuated into a vacuum environment, and then the interior of the autoclave reactor is heated up to the reaction temperature, such that the plurality of aluminum powders react with a reaction gas of the silicon tetrahalide into a plurality of silicon nano-powders and an aluminum trihalides. The pressure in the autoclave reactor is determined by the amount of silicon tetrahalide charged. The pressure during the reaction can range from 1 atm to 100 atm. The higher the pressure of the silicon tetrahalide vapor in the autoclave reactor is, the higher the reaction rate can be. After the temperature of the autoclave reactor is lowered, the plurality of silicon nano-powders are removed from the autoclave reactor, and then are performed an acid washing treatment to a plurality of purified silicon nano-powders. However, the production efficiency of the above approach is still low. Therefore, the invention also discloses a manufacturing equipment with high mass production efficiency.

Figure 2:
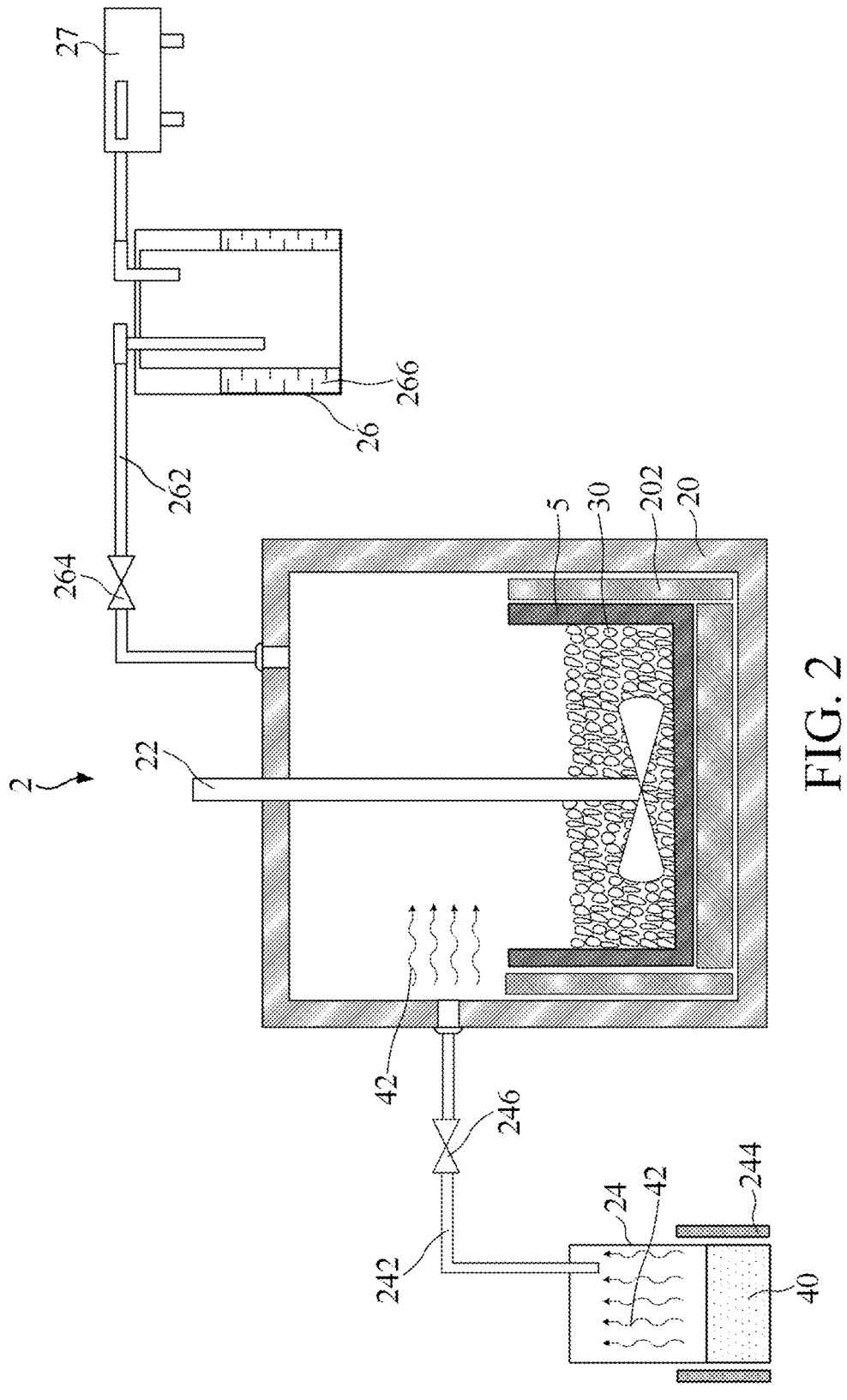
FIG. 2 is a schematic diagram showing the architecture of a manufacturing equipment according to the preferred embodiment of the invention.
Figure 3:
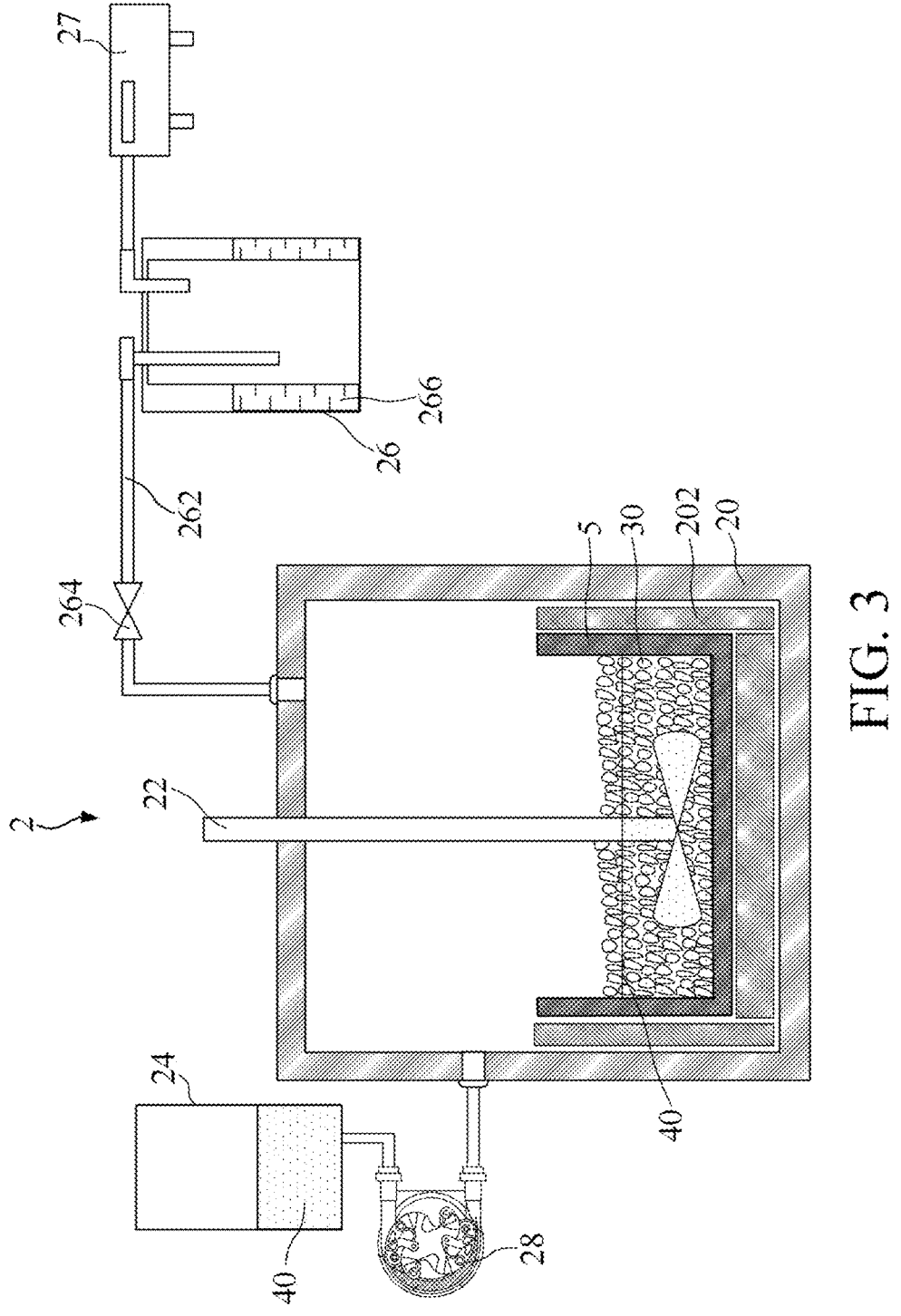
FIG. 3 is a schematic diagram showing the architecture of a modification of the manufacturing equipment according to the preferred embodiment of the invention.
Figure 4:
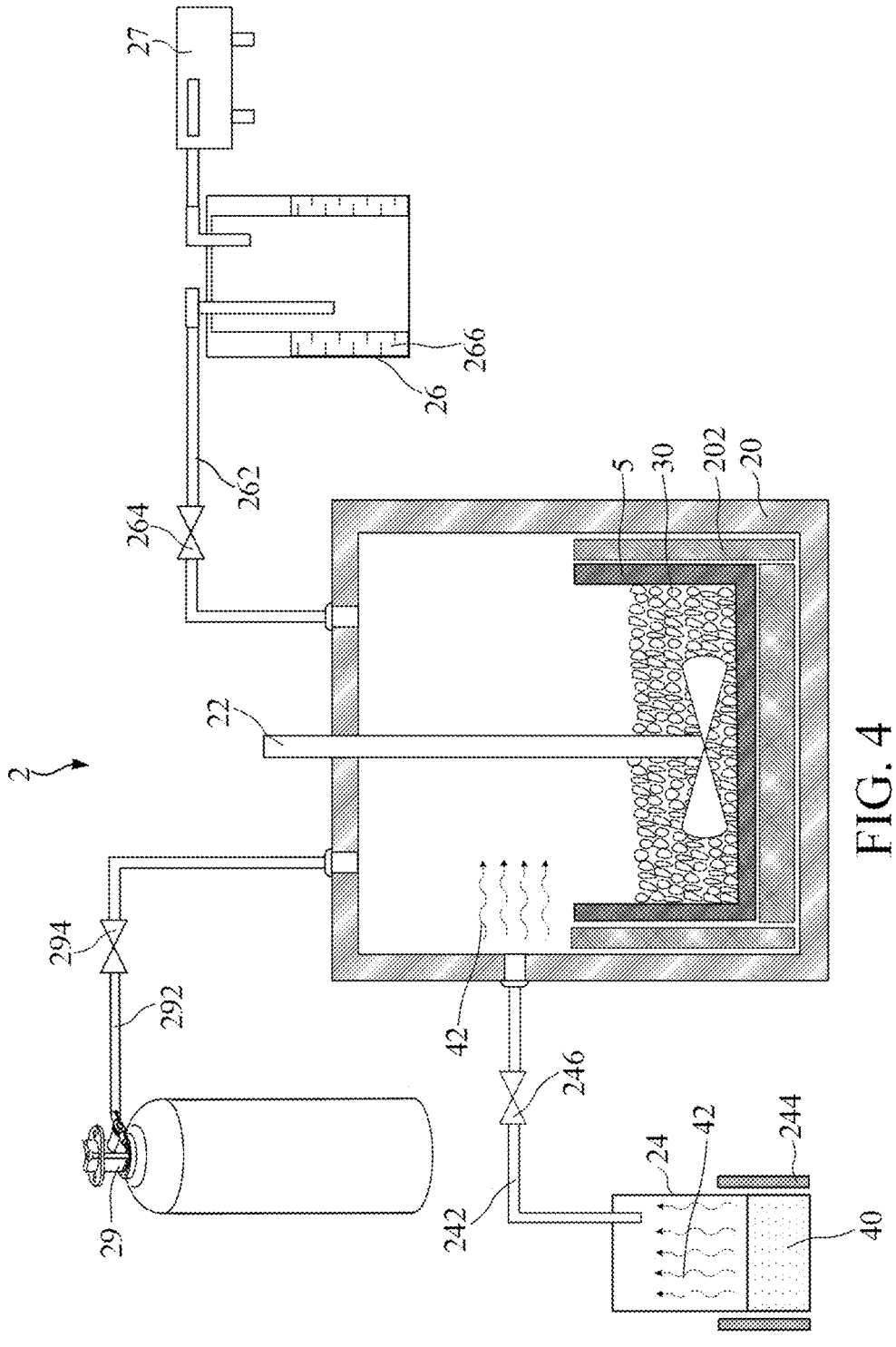
FIG. 4 is a schematic diagram showing the architecture of another modification of the manufacturing equipment according to the preferred embodiment of the invention.

Referring FIG. 2, FIG. 3 and FIG. 4, FIG. 2 is a schematic diagram showing the architecture of a manufacturing equipment 2 according to the preferred embodiment of the invention. In FIG. 2, some devices and apparatuses are shown in cross-sectional view. FIG. 3 is a schematic diagram showing the architecture of a modification of the manufacturing equipment 2 according to the preferred embodiment of the invention. FIG. 4 is a schematic diagram showing the architecture of another modification of the manufacturing equipment 2 according to the preferred embodiment of the invention.

As shown in FIG. 2, the manufacturing equipment 2 for manufacturing a plurality of silicon nano-powders, according to the preferred embodiment of the invention, includes a furnace 20, a reactant supply source 24 and a recovering apparatus 26.

The furnace 20 includes a heater 202. The reactant supply source 24 communicates with the furnace 20. As shown in FIG. 2, the reactant supply source 24 communicates with the furnace 20 via a first pipeline 242. The reactant supply source 24 is used for supplying a silicon tetrahalide into the furnace 20. The recovering apparatus 26 communicates with the top of the furnace 20. As shown in FIG. 2, the recovering apparatus 26 communicates with the top of the furnace 20 via a second pipeline 262.

Also as shown in FIG. 2, the manufacturing equipment 2 according to the preferred embodiment of the invention further includes a vacuum pumping apparatus 27. The vacuum pumping apparatus 27 is communicated behind the recovering apparatus 26. The manufacturing equipment 2 according to the preferred embodiment of the invention further includes a control valve 264. The control valve 264 is installed in the second pipeline 262. But the invention is not limited thereto. The recovering apparatus 26 and the vacuum pumping apparatus 27 may communicate with the furnace 20 respectively. The vacuum pumping apparatus 27 is used to pump the interior of the furnace 20 into a vacuum environment.

Also as shown in FIG. 2, the reactant supply source 24 therein contains a silicon tetrahalide liquid 40. The reactant supply source 24 includes a heater 244 and a control valve 246. The heater 244 is used for heating the silicon tetrahalide liquid 40 contained in the reactant supply source 24 to generate the silicon tetrahalide reaction gas 42. The control valve 246 is installed in the first pipeline 242 to control the reaction gas 42 of silicon tetrahalide to flow into the furnace 20. But the invention is not limited thereto.

As shown in FIG. 3, he manufacturing equipment 2 according to the preferred embodiment of the invention further includes a pump 28. In FIG. 3, the pump 28 is a peristaltic pump, but the invention is not limited thereto. The pump 28 is connected between the reactant supply source 24 and the furnace 20. The manufacturing equipment 2 according to the preferred embodiment of the invention can also use the pump 28 to feed the silicon tetrahalide liquid 40 contained in the reactant supply source 24 into the furnace 20. The devices and members in FIG. 3 identical to those shown in FIG. 2 are given the same numerical notations, and will be not described in detail herein.

As shown in FIG. 4, the manufacturing equipment 2 according to the preferred embodiment of the invention further includes a protection gas supply source 29. The protection gas supply source 29 communicates with the furnace 20 via a third pipeline 292. The manufacturing equipment 2 according to the preferred embodiment of the invention further includes a control valve 294. The control valve 294 is installed in the third pipeline 292. The protection gas supply source 29 is used to supply a protection gas into the furnace 20, for example, neon, argon, nitrogen and so on. The devices and members in FIG. 4 identical to those shown in FIG. 2 are given the same numerical notations, and will be not described in detail herein.

Also as shown in FIG. 2, FIG. 3 and FIG. 4, the manufacturing equipment 2 according to a preferred embodiment of the invention also includes a stirring apparatus 22. The stirring apparatus 22 is configured to operate within the furnace 20. The stirring apparatus 22 stirs the plurality of aluminum powders during the reaction between the plurality of aluminum powders and the reaction gas.

Figure 5:
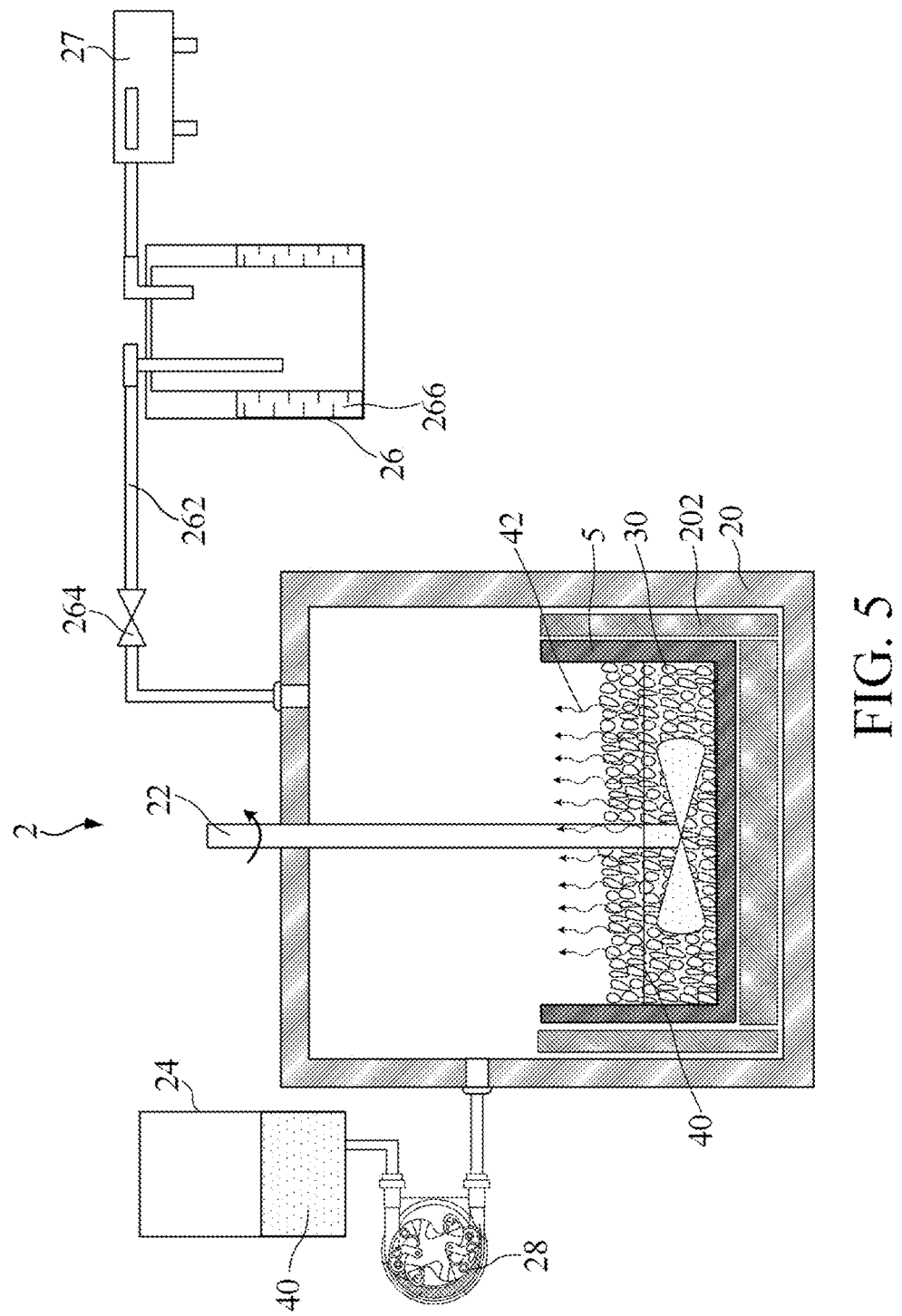
FIGS. 5 and 6 are schematic diagram s of the manufacturing equipment shown in FIG. 3 at different stages of manufacturing the plurality of silicon nano-powders.

Referring to FIG. 3, FIG. 5, and FIG. 6 again, by using the manufacturing equipment 2 according to the preferred embodiment of the invention, the manufacture of a plurality of silicon nano-powders 32 is described hereinafter.

As shown in FIG. 3, a plurality of aluminum powders 30 are placed in a crucible 5, and then the crucible 5 containing the plurality of aluminum powders 30 is placed in the furnace 20. The heater 202 surrounds the outer wall of the crucible 5. The vacuum pumping apparatus 27 first pumps the interior of furnace 20 into a vacuum environment. After the furnace 20 is evacuated into the vacuum environment, the control valve 264 is closed. The pump 28 feeds the silicon tetrahalide liquid 40 contained in the reactant supply source 24 into the furnace 20.

As shown in FIG. 5, the heater 202 heats the plurality of aluminum powders 30 and the reaction gas 42 of the silicon tetrahalide to the reaction temperature. The reaction temperature ranges from 100° C. to 660° C. The silicon tetrahalide liquid 40 evaporates into the reaction gas 42 of the silicon tetrahalide.

Figure 6:
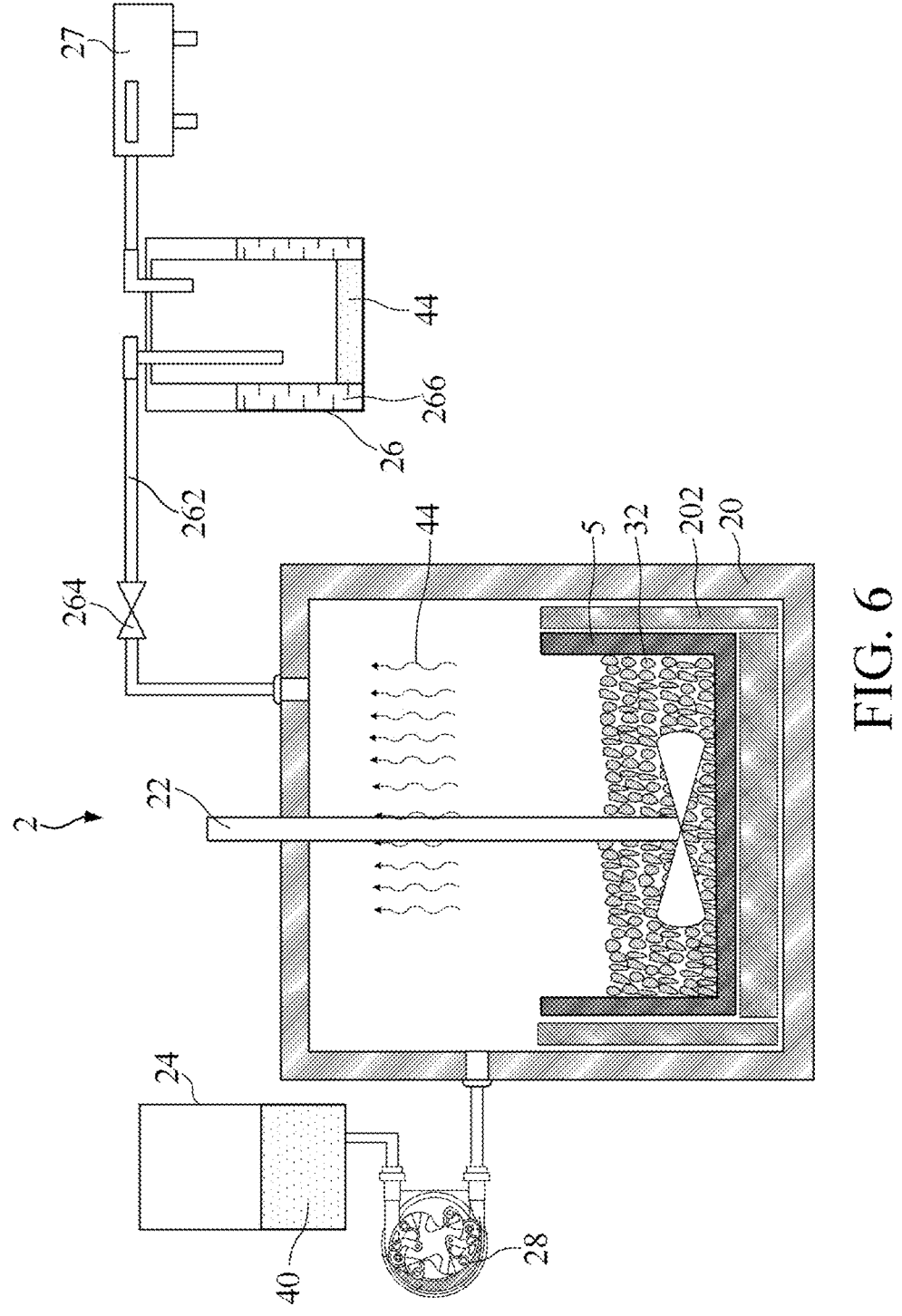

As shown in FIG. 6, after the plurality of aluminum powders 30 and the reaction gas 42 of the silicon tetrahalide are heated to the reaction temperature, the plurality of aluminum powders 30 and the reaction gas 42 of silicon tetrahalide react into a plurality of silicon nano-powders 32 and the aluminum trihalide 44. In FIG. 6, only the plurality of silicon nano-powders 32 and the aluminum trihalide 44 in the form of gas are shown in the furnace 20. The reaction temperature is held until the plurality of aluminum powders 30 completely react with the reaction gas 42 of the silicon tetrahalide. It is considered that the covered aluminum powder 30 cannot contact and react with the reaction gas 42 of the silicon tetrahalide when a large amount of aluminum powder 30 is used to mass-produce a plurality of silicon nano-powders 32. Therefore, according to the invention, during the reaction between the plurality of aluminum powders 30 and the reaction gas 42 of the silicon tetrahalide, the stirring apparatus 22 stirs the plurality of aluminum powders 30, such that the plurality of aluminum powders 30 can contact and react with the reaction gas 42 of the silicon tetrahalide as a whole, so as to realize mass production goals.

Also as shown in FIG. 6, because the boiling point of the aluminum trihalide 44 is lower than the reaction temperature ranging from 100 to 660° C., the aluminum trihalide 44 will sublimate into a gas and separate from the plurality of silicon nano-powders 32. The gaseous aluminum trihalide 44 is recovered by the recovering apparatus 26. In one embodiment, the recovering apparatus 26 condenses the gas-forming aluminum trihalide 44 by using the low-temperature water 266.

Figure 7:
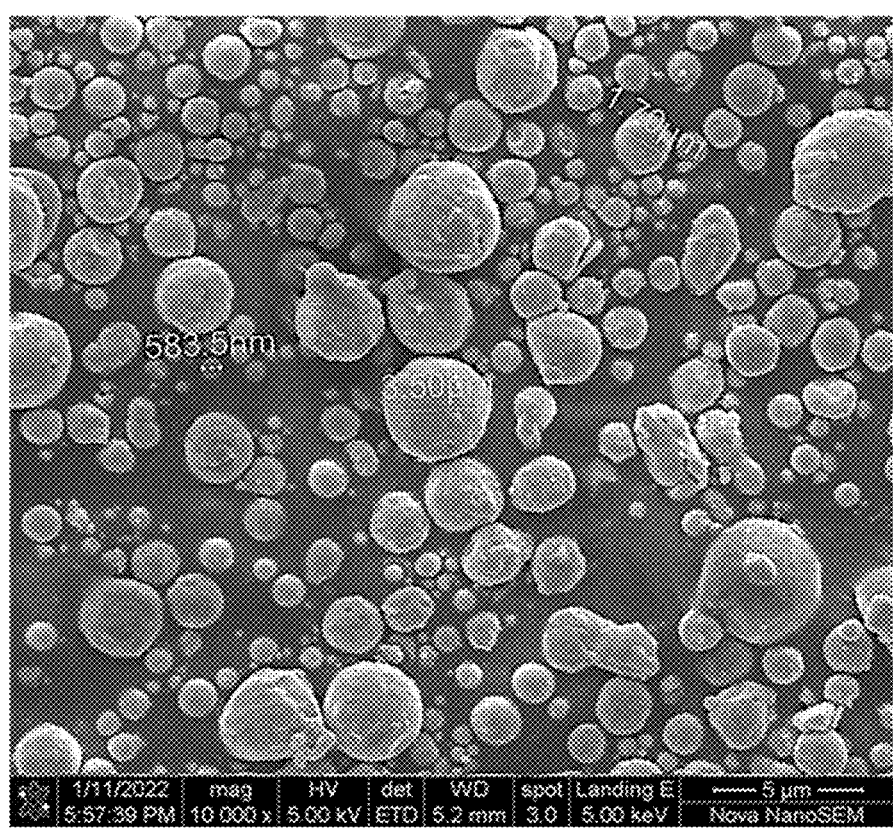
FIG. 7 is a scanning electron microscope (SEM) photograph of a plurality of aluminum powders used in the first example of the invention.
Figure 8:
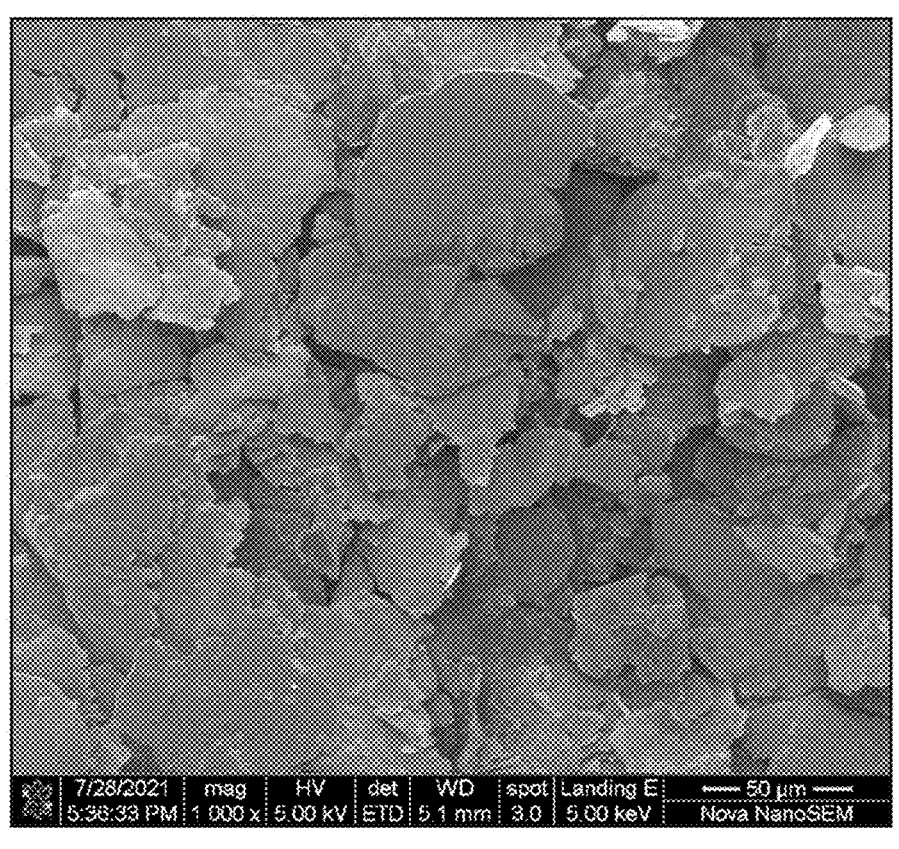
FIG. 8 is an SEM photograph of the rolled aluminum powders used in the first example of the invention and the composition analysis result by Energy-dispersive X-ray spectroscopy (EDS).
Figure 9:
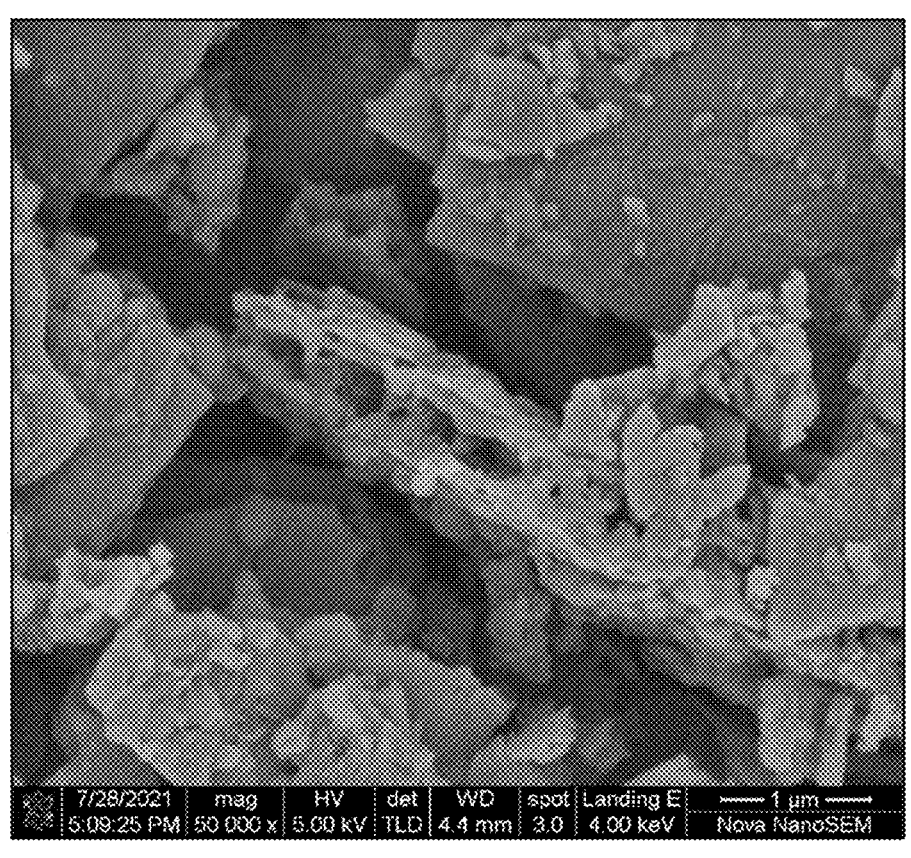
FIG. 9 is an SEM photograph of the top surface of the plurality of silicon nano-powders manufactured and purified in the first example of the invention.

In the first example, please refer to FIG. 7 to FIG. 9, the method according to the invention is to prepare 0.4 g of aluminum powders and 2 g of $SiCl_4$. The aluminum powders used are high-purity aluminum powders which are originally used to manufacture a conductive aluminum paste. The shape of the used aluminum powders is close to spherical. The SEM photograph of the aluminum powders is shown in FIG. 7. In FIG. 7, the particle size of the used aluminum powder ranges from hundreds of nanometers to several micrometers. The used aluminum powders with a shape close to spherical are rolled into aluminum powders with a flake shape, and the SEM photograph of the rolled aluminum powders is shown in FIG. 8. The result of EDS analysis of the composition of the aluminum powders used is also shown in FIG. 8. In FIG. 8, the aluminum powders used are in the form of flakes, and the aluminum powders used have high aluminum content percentage and small amounts of carbon and oxygen impurities.

Figure 10:
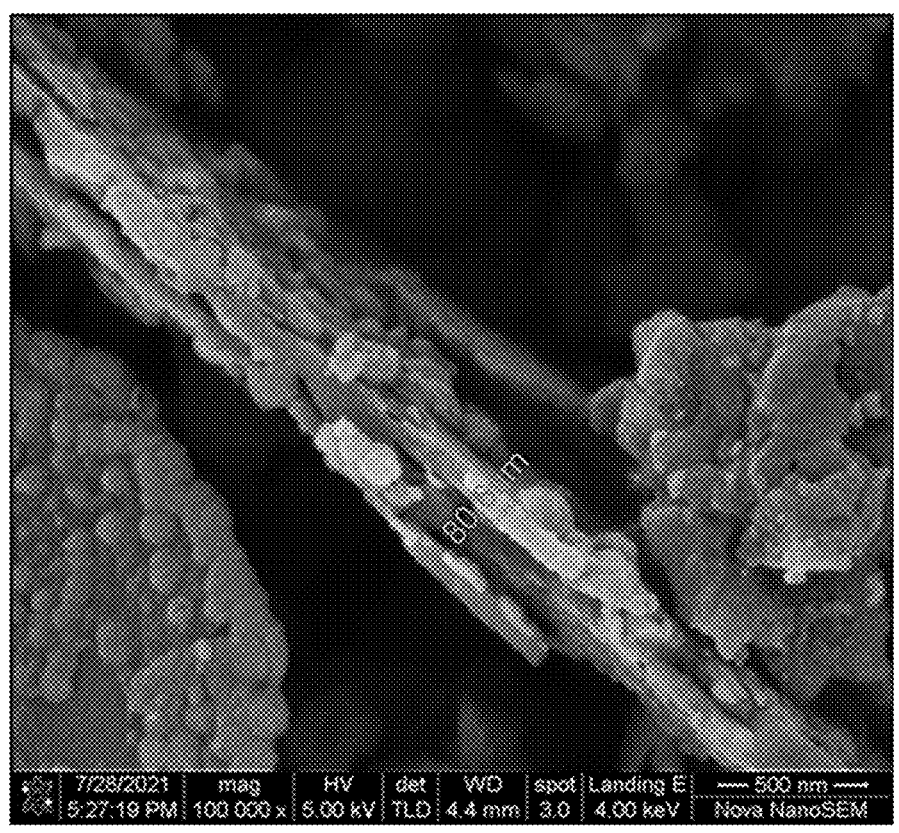
FIG. 10 is an SEM photograph of the side surface of the plurality of silicon nano-powders manufactured and purified in the first example of the invention.

Compared with the amount of aluminum powders to be reacted, the used $SiCl_4$ is about 10% in excess. 0.4 g of aluminum powders and 2 g of $SiCl_4$ are placed in an autoclave reactor with a capacity of 5 ml. By using the autoclave reactor, 0.4 g of aluminum powders and 2 g of $SiCl_4$ are heated to 300° C. for 10 hours, such that the aluminum powders react the reaction gas sublimated from $SiCl_4$ into a plurality of silicon nano-powders and $AlCl_3$. The plurality of silicon nano-powders are taken out from the autoclave reactor, and then are pickled with 10 vol. % HCl acid solution for 5 minutes, and then are washed with clean water to purify the plurality of silicon nano-powders. The SEM photograph of the top surface of the purified silicon nano-powders is shown in FIG. 9. The composition result of the purified silicon nano-powders analyzed by EDS is also shown in FIG. 9. The SEM photograph of the side surface of the purified silicon nano-powders is shown in FIG. 10. In FIG. 9, the silicon nano-powders are in the shape of nano-sheets, and the purified silicon nano-powders have extremely high silicon content percentage, and have extremely small amounts of carbon, oxygen, aluminum, and chlorine impurities. In FIG. 10, the plurality of silicon nano-powders are shown with a thickness of about 80 nm. The first example described in the present invention is suitable for small-volume production of the plurality of silicon nano-powders.

Figure 11:
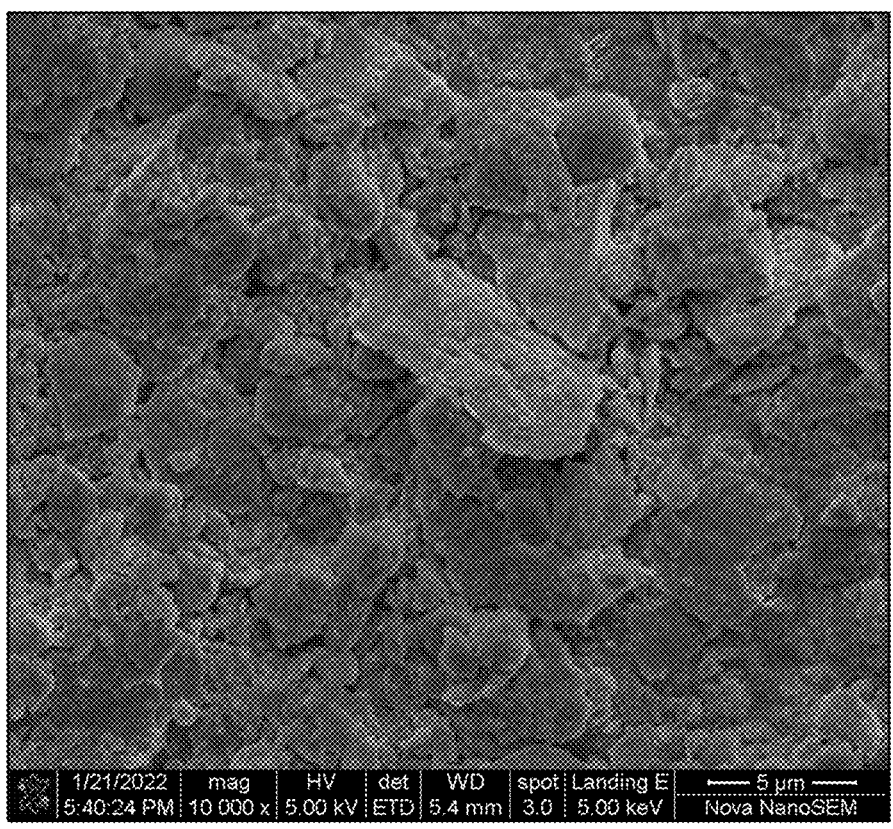
FIG. 11 is an SEM photograph of the top surface of the plurality of silicon nano-powders manufactured in the second example of the invention.
Figure 12:
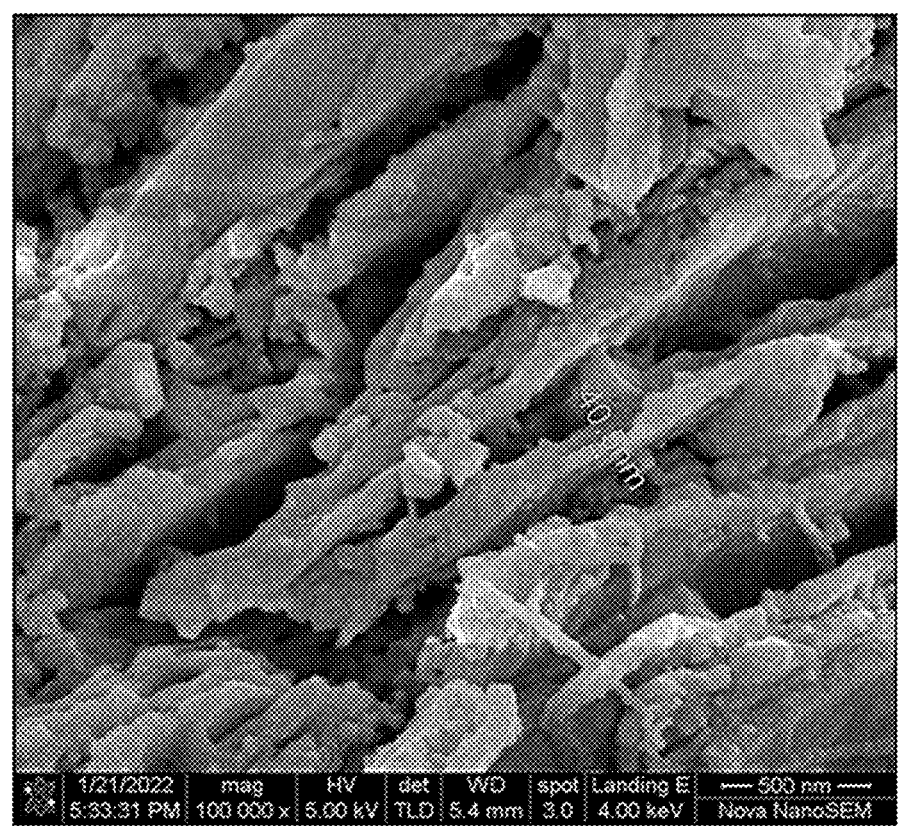
FIG. 12 is an SEM photograph of the side surface of the plurality of silicon nano-powders manufactured in the second example of the invention.

In the second example, please refer to FIG. 8, FIG. 11 and FIG. 12, the method according to the invention is to prepare 15 g of aluminum powders and 55 g of $SiCl_4$. The SEM photograph and the composition result of the EDS analysis of the aluminum powders used are shown in FIG. 8. A plurality of silicon nano-powders are manufactured by using the manufacturing equipment 2 shown in FIG. 3. $SiCl_4$ is fed into the furnace 20 by means of the pump 28. The furnace 20 heats the aluminum powders and SiCl4 to 300° C. for 10 hours, such that the aluminum powders react with the reaction gas sublimated from $SiCl_4$ into a plurality of silicon nano-powders and $AlCl_3$. During the reaction between the aluminum powders and the reaction gas, the stirring apparatus 22 stirs the aluminum powders such that all of the aluminum powders can contact and react with the reaction gas of silicon tetrahalide. $AlCl_3$ will be sublimated into gas and recovered by the recovering apparatus 26. The SEM photograph of the top surface of the plurality of manufactured silicon nano-powders is shown in FIG. 11. The SEM photograph of the side surface of the plurality of manufactured silicon nano-powders is shown in FIG. 12. In FIG. 11, the plurality of manufactured silicon nano-powders are in the form of nano-sheets. In FIG. 12, the plurality of manufactured silicon nano-powders show a thickness of about 40~80 nm. The second example of the invention is suitable for mass production of a plurality of silicon nano-powders.

Figure 13:
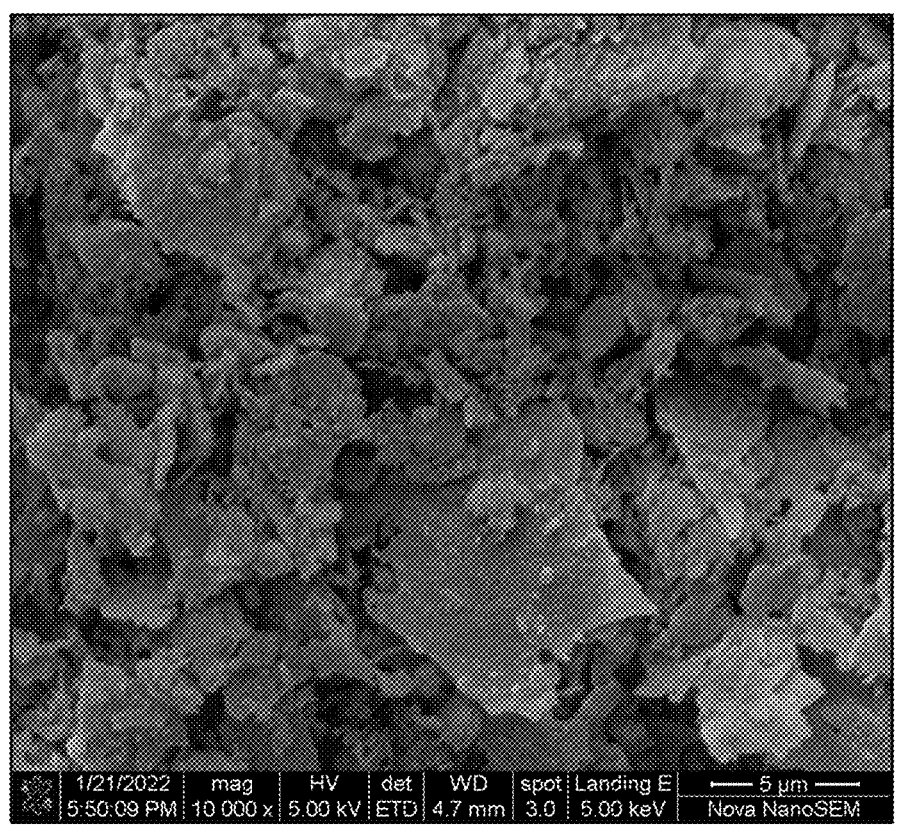
FIG. 13 is an SEM photograph of the top surface of the plurality of silicon nano-powders manufactured and purified in the second example of the invention.
Figure 14:
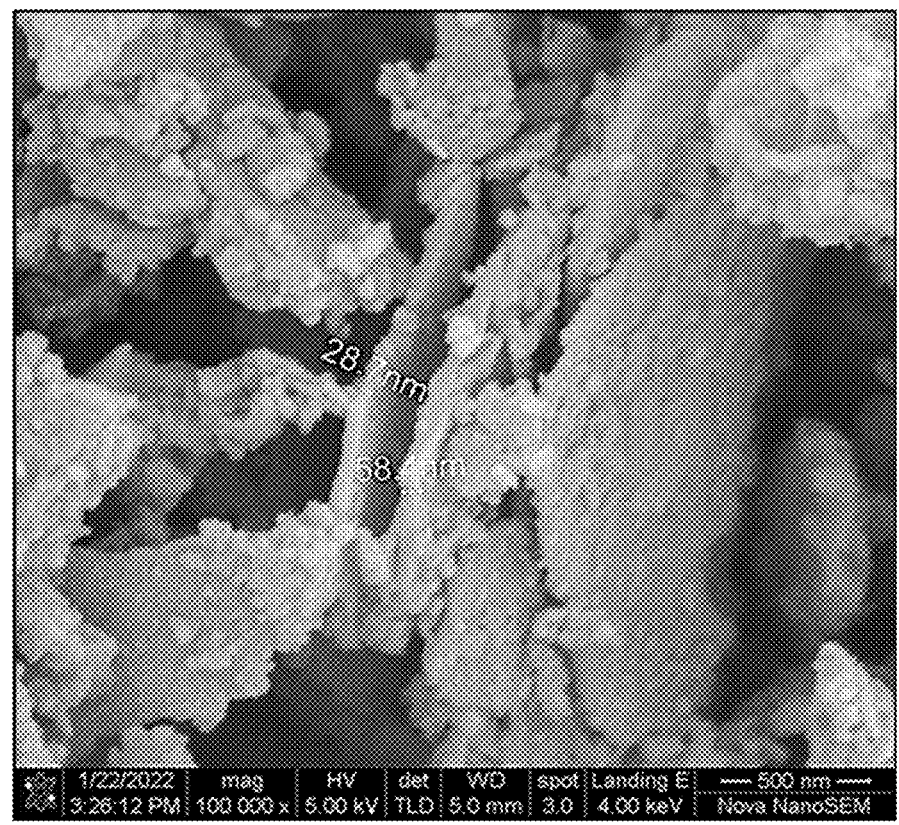
FIG. 14 is an SEM photograph of the side surface of the plurality of silicon nano-powders manufactured and purified in the second example of the invention.

The manufactured silicon nano-powders are pickled with 10 vol. % HCl acid solution, and then washed with clean water to purify the silicon nano-powders. The SEM photograph of the top surface of the purified silicon nano-powders is shown in FIG. 13. The SEM photograph of the side surface of the purified silicon nano-powder is shown in FIG. 14. In FIG. 13, the shape of the purified silicon nano-powders still maintains the shape of nano-sheets. In FIG. 14, the thickness of the nano-sheets of the purified silicon nano-powders does not change.

Figure 15:
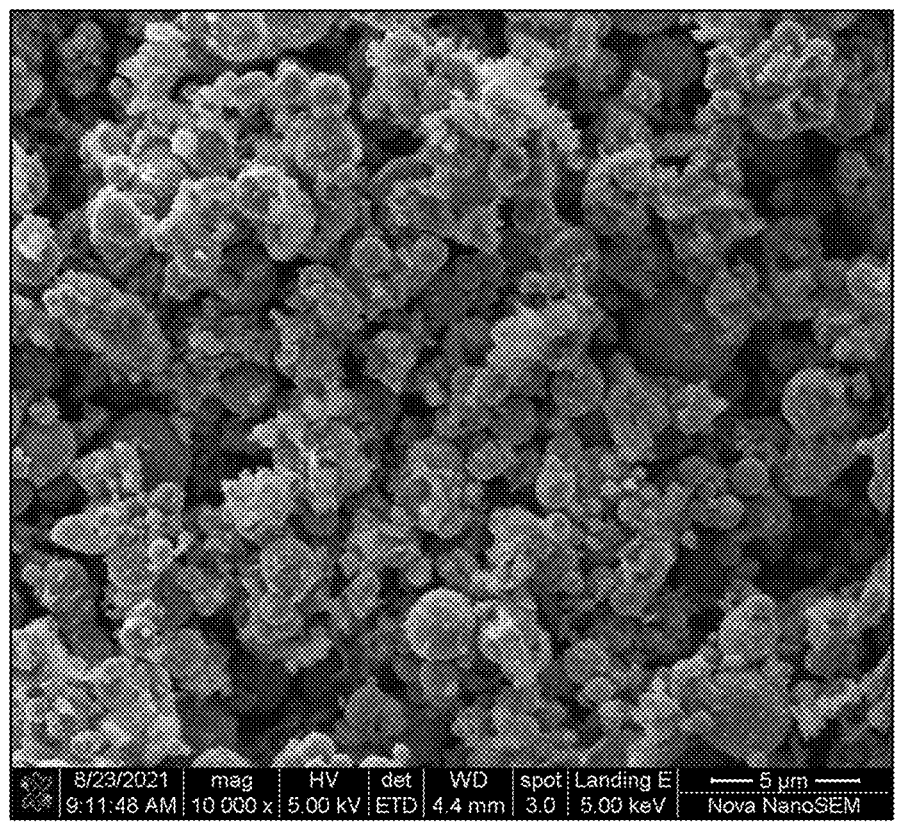
FIG. 15 is an SEM photograph of the appearance of the plurality of silicon nano-powders manufactured in the third example of the invention.

In the third example, please refer to FIG. 7 and FIG. 15, the method according to the invention is to prepare 15 g of aluminum powders and 55 g of $SiCl_4$. The SEM photograph of the aluminum powders used are also shown in FIG. 7, that is to say, the aluminum powders whose shape is close to spherical are used. A plurality of silicon nano-powders are manufactured by using the manufacturing equipment 2 shown in FIG. 3. $SiCl_4$ is fed into the furnace 20 by means of the pump 28. The furnace 20 heats the aluminum powders and SiCl4 to 300° C. for 10 hours, such that the aluminum powders react with the reaction gas sublimated from $SiCl_4$ into a plurality of silicon nano-powders and $AlCl_3$. During the reaction between the aluminum powders and the reaction gas, the stirring apparatus 22 stirs the aluminum powders such that all of the aluminum powders can contact and react with the reaction gas of silicon tetrahalide. $AlCl_3$ will be sublimated into gas and recovered by the recovering apparatus 26. The SEM photograph of the appearance of the plurality of manufactured silicon nano-powders is shown in FIG. 15. In FIG. 15, the shape of the plurality of silicon nano-powders is close to spherical.

With the detailed description of the above several examples of the invention, it can be proved that the method according to the invention can produce silicon nanometer powder with various shapes, high purity and large mass production.

With the detailed description of the above preferred embodiments of the invention, it is clear to understand that the method according to the invention can manufacture a plurality of silicon nano-powders with easy shape control, high purity and mass production. The manufacturing equipment according to the invention is beneficial to the mass production of a plurality of silicon nano-powders with high purity.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method of manufacturing a plurality of silicon nano-powders, comprising the steps of:

preparing a plurality of aluminum powders and a silicon tetrahalide; and heating the plurality of aluminum powders and the silicon tetrahalide to a reaction temperature such that the plurality of aluminum powders react with a reaction gas of the silicon tetrahalide into a plurality of silicon nano-powders and an aluminum trihalide, to obtain the plurality of silicon nano-powders, wherein the reaction temperature ranges from 100° C. to 660° C.

2. The method of claim 1, wherein the silicon tetrahalide is one selected from the group consisting of $SiF_4$, $SiCl_4$, $SiBr_4$, $SiI_4$ and a mixture therebetween.

3. The method of claim 2, wherein an appearance of one of the plurality of silicon nano-powders exhibits one selected from the group consisting of a flake, a sphere, a wire and a tube.

4. The method of claim 3, further comprising the steps of:

performing an acid washing treatment on the plurality of silicon nano-powders to purify the plurality of silicon nano-powders.

5. The method of claim 3, further comprising the steps of:

heating the plurality of silicon nano-powders and the aluminum trihalide to sublimate the aluminum trihalide, and further to purify the plurality of silicon nano-powders.

* * * * *